United States Patent
Streat (10) Patent No.: US 11,685,189 B2
(45) Date of Patent: Jun. 27, 2023

(54) AXLE ASSEMBLY

(71) Applicant: J.C. BAMFORD EXCAVATORS LIMITED, Uttoxeter (GB)

(72) Inventor: Christopher Jack Streat, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 123 days.

(21) Appl. No.: 17/153,870

(22) Filed: Jan. 20, 2021

(65) Prior Publication Data
US 2021/0221173 A1    Jul. 22, 2021

(30) Foreign Application Priority Data
Jan. 20, 2020   (GB) ...................... 2000801

(51) Int. Cl.
*B60B 35/00* (2006.01)
*B62D 21/18* (2006.01)
*B62D 49/06* (2006.01)

(52) U.S. Cl.
CPC .......... *B60B 35/003* (2013.01); *B62D 21/186* (2013.01); *B62D 49/0678* (2013.01)

(58) Field of Classification Search
CPC . B62D 5/12; B62D 7/09; B62D 7/142; B62D 7/20; B62D 7/10; B62D 5/00; B62D 3/02; B62D 49/0678; B62D 21/186; B60B 35/003; B60B 35/109
USPC ....................................................... 280/638
See application file for complete search history.

(56) References Cited

U.S. PATENT DOCUMENTS

| | | | | |
|---|---|---|---|---|
| 4,359,123 A | * | 11/1982 | Haupt ................... | B62D 17/00 180/436 |
| 4,475,615 A | * | 10/1984 | Stanek ................... | B62D 5/12 180/417 |
| 4,536,003 A | * | 8/1985 | Maurer ................... | B62D 7/18 280/93.5 |

(Continued)

FOREIGN PATENT DOCUMENTS

| | | |
|---|---|---|
| DE | 3720273 A1 | 1/1989 |
| GB | 1346525 A | 2/1974 |

(Continued)

OTHER PUBLICATIONS

Search Report for GB 2000801.7, dated Jun. 5, 2020.

*Primary Examiner* — Paul N Dickson
*Assistant Examiner* — Caitlin Anne Miller
(74) *Attorney, Agent, or Firm* — Marshall, Gerstein & Borun LLP (57) ABSTRACT

An axle assembly is provided for a working machine. The axle assembly includes an axle having first and second ends, the first end having a first wheel mount for pivotably mounting a first wheel to the axle and the second end having a second wheel mount for pivotably mounting a second wheel to the axle. The assembly has a steering arrangement for pivoting the first and second wheel mounts relative to the axle, the steering arrangement having a linkage connected to the first and second wheel mounts and configured to pivot the first and second wheel mounts relative to the axle. The steering arrangement also includes an actuator configured to actuate the steering linkage in order to effect pivoting of the first and second wheel mounts, and the actuator is directly connected to the steering linkage.

21 Claims, 6 Drawing Sheets

(56) References Cited

U.S. PATENT DOCUMENTS

| | | | | |
|---|---|---|---|---|
| 7,182,353 | B2* | 2/2007 | Divers | B60T 11/21 |
| | | | | 188/350 |
| 7,854,293 | B2* | 12/2010 | Derby, V | A01D 75/306 |
| | | | | 180/436 |
| 8,353,377 | B2* | 1/2013 | Geiger | B62D 5/12 |
| | | | | 180/436 |
| 11,332,190 | B1* | 5/2022 | Shepherd | B62D 6/04 |
| 2005/0167939 | A1* | 8/2005 | Howard | B62D 7/228 |
| | | | | 280/89.11 |
| 2008/0202843 | A1* | 8/2008 | Mair | B62D 7/09 |
| | | | | 180/448 |
| 2009/0045004 | A1* | 2/2009 | Panizzolo | B62D 7/09 |
| | | | | 180/414 |
| 2011/0291373 | A1* | 12/2011 | Dillard | B62D 13/025 |
| | | | | 280/81.6 |
| 2017/0158232 | A1* | 6/2017 | Palmute | B62D 5/12 |

FOREIGN PATENT DOCUMENTS

| | | |
|---|---|---|
| JP | S63101176 A | 5/1988 |
| JP | H02127171 A | 5/1990 |

* cited by examiner

AXLE ASSEMBLY

FIELD

The present teachings relate to an axle assembly for a working machine, an undercarriage for a working machine and to a working machine.

BACKGROUND

Various types of working machines are known such as excavators (e.g. slew excavators), telehandlers and backhoe loaders. Such machines may typically be used for soil-shifting operations (e.g. trenching, grading, and loading) and materials handling (e.g. depositing aggregate in trenches, lifting materials and placing them on an elevated platform). If the working machine uses wheels for propulsion, a steering arrangement is used for steering either two or four wheels.

Various arrangements exist for providing steering actuation for known working machines. However, in many of the known steering arrangements, they are limited in the steering angles they are able to provide. Moreover, providing a differential of steer angle between inner and outer wheels is important for smooth travel for working machines with four wheel steer and short wheelbases. Such differential steer angles between the wheels may not be possible on such known steering arrangements or may require complex components and steering assemblies.

The present teachings seek to overcome or at least mitigate one or more problems associated with the prior art.

SUMMARY

A first aspect provides an axle assembly for a working machine, the axle assembly comprising: an axle having first and second ends, the first end having a first wheel mount for pivotably mounting a first wheel to the axle and the second end having a second wheel mount for pivotably mounting a second wheel to the axle; and a steering arrangement for pivoting the first and second wheel mounts relative to the axle, the steering arrangement comprising a steering linkage connected to the first and second wheel mounts and configured to pivot the first and second wheel mounts relative to the axle, wherein the steering arrangement comprises an actuator configured to actuate the steering linkage in order to effect pivoting of the first and second wheel mounts, and wherein the actuator is directly connected to the steering linkage.

Providing an axle assembly with a steering arrangement that uses only a single linkage between the first and second wheel mounts and a single actuator provides a highly compact steering arrangement. Directly connecting the actuator to the steering linkage has been found to enable high steer angles.

The steering arrangement may be configured to pivot the first and second wheel mounts at different angles relative to the axle.

Providing different steering angles to the first and second wheels during a turning manoeuvre has been found to provide smoother and more efficient turning of a working machine.

The steering arrangement may be configured to provide Ackermann steering to the first and second wheel mounts.

Ackerman steering refers to turning the inside and outside wheels at angles that follow the theoretical arcs. Such an arrangement provides the optimal angles for the first and second wheels during a steering operation so as to prevent tire scrubbing during turns.

The actuator may be a linear actuator.

This arrangement provides a steering arrangement that is able to facilitate the actuation of steering via a single, double-acting linear actuator. The use of a single linear actuator helps to provide a compact steering arrangement.

A first end of the actuator may be pivotally connected to the axle and a second end of the actuator may be connected to the steering linkage.

This arrangement utilised only two components, the actuator and the steering linkage, in order to effect steering of the first and second wheel mounts, thus providing a compact steering arrangement requiring fewer components.

The axle may define a central elongate axis, and the steering linkage may be connected to the first and second wheel mounts at first and second connection points, said first and second connection points arranged to be spaced apart from said central elongate axis of the axle.

Positioning the connections between the actuator and the wheel mounts spaced apart from (i.e. inboard or outboard) a central axis of the axis has been found to increase the maximum steer angle that can be provided by the steering arrangement.

A first end of the actuator may be pivotally connected to the axle at a third connection point, and the third connection point may be arranged to be substantially co-planar with the central elongate axis of the axle or is arranged to be on an opposing side of the central elongate axis of the axle to the first and second connection points.

Positioning the connection between the actuator and the axle to be in line with the central elongate axis of the axle has been found to increase the maximum steer angle that can be provided by the steering arrangement. Positioning the connection between the actuator and the axle to be spaced apart from the central elongate axis of the axle on an opposing side to the wheel mount-actuator connection points further increases the maximum steer angle that can be provided by the steering arrangement.

The position of the third connection point may be fixed relative to the axle.

A second end of the actuator may be connected to the steering linkage at a fourth connection point, and the fourth connection point may be arranged to be co-planar with the central elongate axis of the axle or is arranged to be on an opposing side of the central elongate axis of the axle to the first and second connection points.

Positioning the connection between the actuator and the steering linkage to be in line with the central elongate axis of the axle has been found to increase the maximum steer angle that can be provided by the steering arrangement. Positioning the connection between the actuator and the steering linkage to be spaced apart from the central elongate axis of the axle on an opposing side to the wheel mount-actuator connection points further increases the maximum steer angle that can be provided by the steering arrangement.

When the first and second wheel mounts are arranged to be substantially parallel, the actuator may be aligned substantially parallel to a central elongate axis of the axle.

Through this arrangement, when the wheel mounts are arranged to drive the wheels straight, the packaging of the steering arrangement is improved.

The axle may define a central elongate axis, and the actuator may be spaced apart from said central elongate axis on a first side of the axle.

A majority of the steering linkage may be spaced apart from said central elongate axis on a second side of the axle opposing said first side of the axle.

The steering linkage and the actuator may be positioned above the axle, in use.

Positioning these components above the axle housing (i.e. on an opposite side of the axle to the ground) has been found to protect these components from impacts and/or dirt from below.

The steering linkage may be formed as a unitary body.

The steering member may be substantially non-linear.

The provision of an angled steering linkage (i.e. a steering linkage having first and second arms that are non-coplanar to each other) has been found to aid in the assembly of the axle assembly onto an undercarriage of a working machine.

The steering linkage may be directly connected to the first and second wheel mounts.

According to a second aspect there is provided an undercarriage for a working machine, the undercarriage comprising: a chassis; a front axle assembly mounted to the chassis; and a rear axle assembly mounted to the chassis, wherein the front axle assembly and/or the rear axle assembly is an axle assembly according to the first aspect.

The front axle assembly and rear axle assembly may each comprise a pair of wheels mounted thereto.

The undercarriage may define a wheelbase and a track width, and the ratio between the wheelbase and the track width may be in the range of 0.8-1.2:1, e.g. approximately 1:1.

The undercarriage may be configured for at least two wheel steer. The undercarriage may be configured for four wheel steer.

The undercarriage may be configured for four wheel drive.

According to a third aspect there is provided a working machine comprising: a base assembly including a ground engaging structure; an undercarriage according to the second aspect, the undercarriage connected to the ground engaging structure; and an operator seat.

The working machine may further comprise a superstructure, e.g. a rotatable superstructure, connected to the undercarriage.

The working machine may further comprise a working arm mounted to the superstructure.

The working machine may be an excavator, a loader, a dumper, a forklift or a telehandler.

BRIEF DESCRIPTION OF THE DRAWINGS

Embodiments will now be described with reference to the accompanying drawings, in which.

DETAILED DESCRIPTION OF EMBODIMENT(S)

Figure 1:
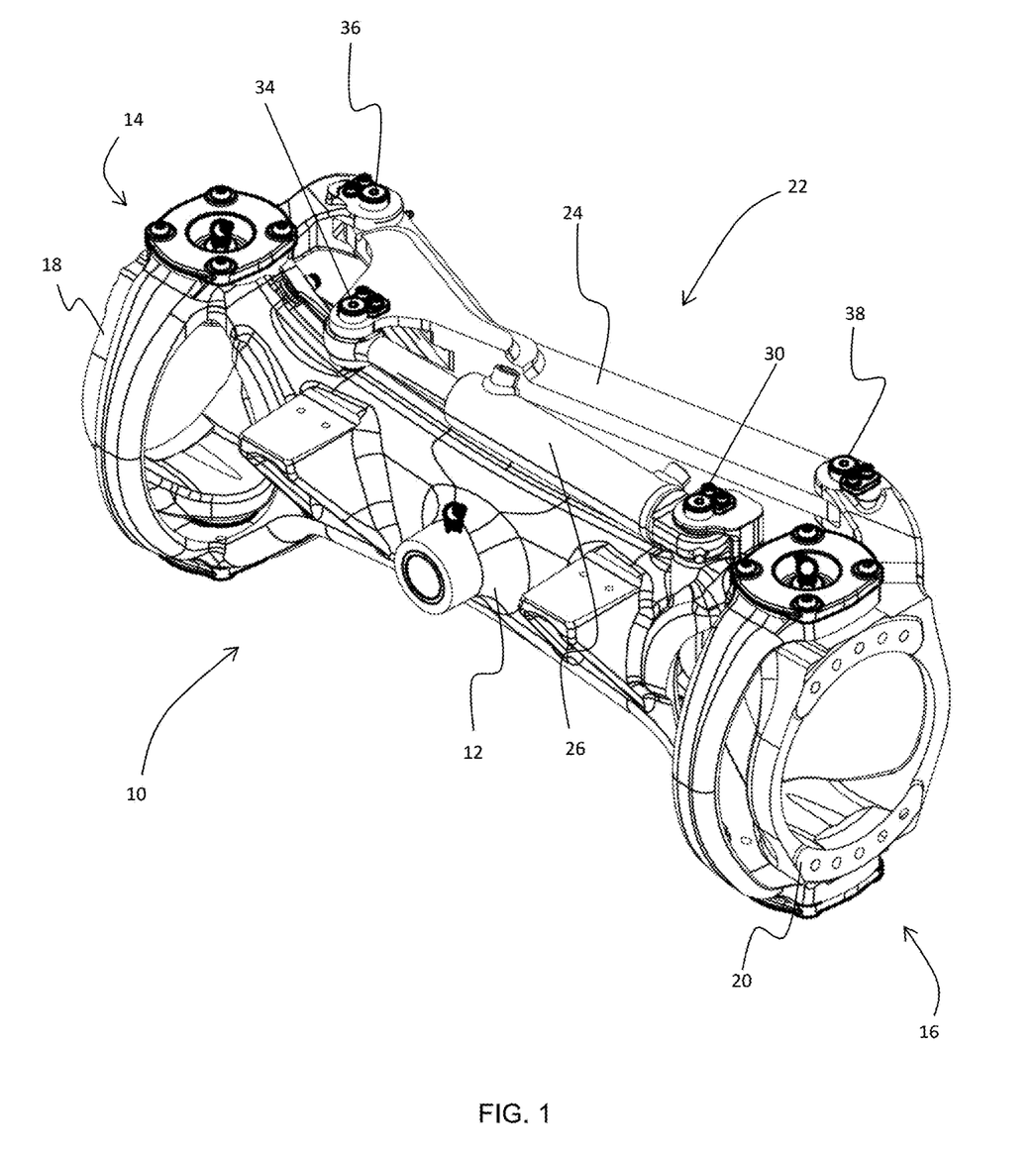
FIG. 1 is an isometric view of an axle assembly according to an embodiment.

Referring firstly to FIG. 1, an axle assembly is indicated generally at 10. The axle assembly 10 includes an axle 12 having first and second ends 14, 16. The first end 14 of the axle 12 includes a first wheel mount 18 for mounting a wheel (not shown) to the axle 12. The second end 16 of the axle 12 includes a second wheel mount 20 for mounting a wheel (not shown) to the axle 12. The first and second wheel mounts 18, 20 are configured such that the wheels are pivotable relative to the axle 12, so as to be capable of steering a working machine (not shown).

The wheels are connected to the axle 12, and are steerable relative to said axle 12, via wheel mounts 18, 20 in the form of steering hubs. The wheels form part of a ground engaging structure for a working machine, and are intended to be driven by a prime mover, via the wheel mounts 18, 20, so as to propel a working machine.

In the illustrated arrangement, the wheel mounts 18, 20 are configured for mounting a motor, e.g. a hydraulic or electric motor (not shown). Each motor in turn then mounts a wheel, such that each wheel is mounted to the axle assembly 10. It will be appreciated that in alternative arrangements the motors may be omitted, and the wheels may be connected directly to a wheel mount in order to mount wheels to the axle 12. An axle shaft may be driven by a prime mover (not shown), and the wheels may be rotatably fixed relative to said axle shaft, such that rotation of the axle shaft drives the wheels to propel a working machine.

In order to effect pivoting of the wheel mounts 18, 20 (and, in turn, steering of the wheels), the axle assembly 10 includes a steering arrangement 22. The steering arrangement 22 is compact and is capable of providing high steer angles whilst requiring fewer components than known arrangements. The steering arrangement 12 includes a steering linkage 24 configured to steer the first and second wheels via the first and second wheel mounts 18, 20.

This steering arrangement 22 provides a single linkage between the first and second wheel mounts 18, 20. Put another way, the steering arrangement 22 provided a linkage member 24 that is directly connected to both the first and second wheel mounts 18, 20. This direct connection between a single linkage member 22 and the first and second wheel mounts 18, 20 provides a compact steering arrangement.

The steering arrangement 22 includes an actuator 26 configured to actuate the steering linkage 24 in order to effect steering of the first and second wheels. In this way, the steering arrangement of the present teaching is able to effect steering of first and second wheels via a single actuator 26. Put another way, the linkage 24 is pivotally connected to the axle 12 and the steering arrangement 22 includes an actuator 26 to pivot the steering linkage 24 and, in turn, pivot the first and second wheel mounts 18, 20. This arrangement enables pivoting of the first and second wheel mounts 18, 20 (and so turning of the wheels) via a single actuator 26.

In the arrangement shown, the actuator 26 is a linear actuator. In this way, the steering arrangement 22 actuates steering of two wheels via a single linear actuator 26 (i.e. the linear actuator is a single, double acting, linear actuator). This helps to provide a compact steering arrangement 22.

The linkage 24 and the actuator 26 are positioned above the axle 12. Put another way, the linkage 24 and the actuator 26 are positioned on an opposing side of the axle 12 to the ground, in use. Positioning these linkage 24 and actuator 26 above the axle housing (i.e. on a side of the axle 12 remote to the ground) has been found to protect these components from impacts and/or dirt from below. In alternative arrangements, the linkage 24 and the actuator 26 may be positioned differently relative to the axle 12 (i.e. they may be positioned in front of, below or behind the axle 12) to suit the application.

Figure 2:
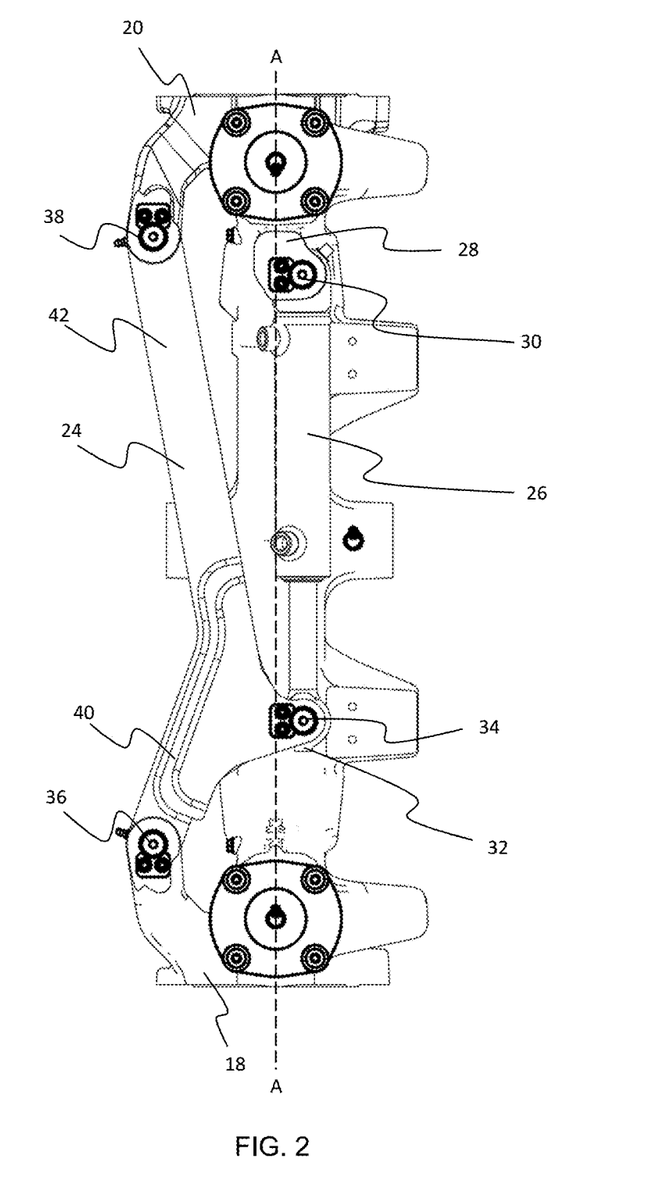
FIG. 2 is a plan view of the axle assembly of FIG. 1 in a first steering position.
Figure 3:
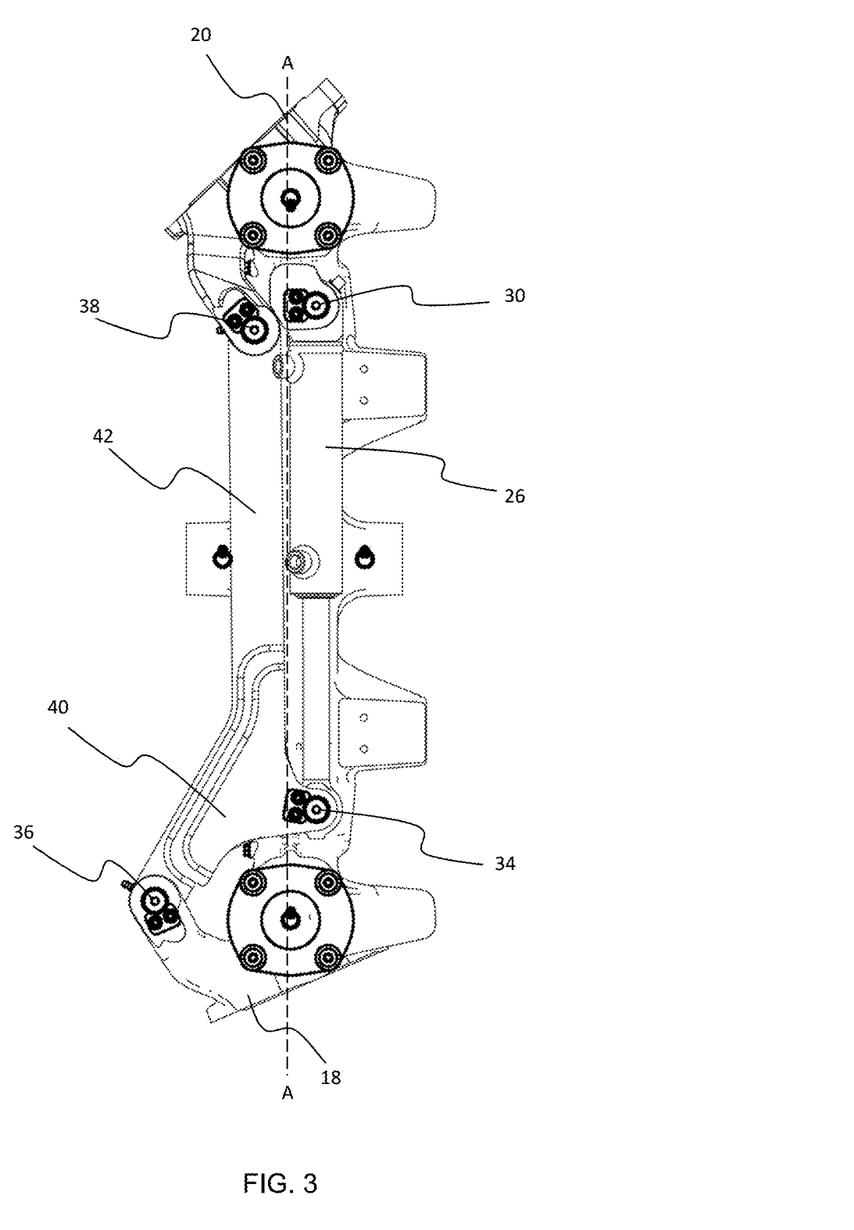
FIG. 3 is a plan view of the axle assembly of FIG. 1 in a second steering position.
Figure 4:
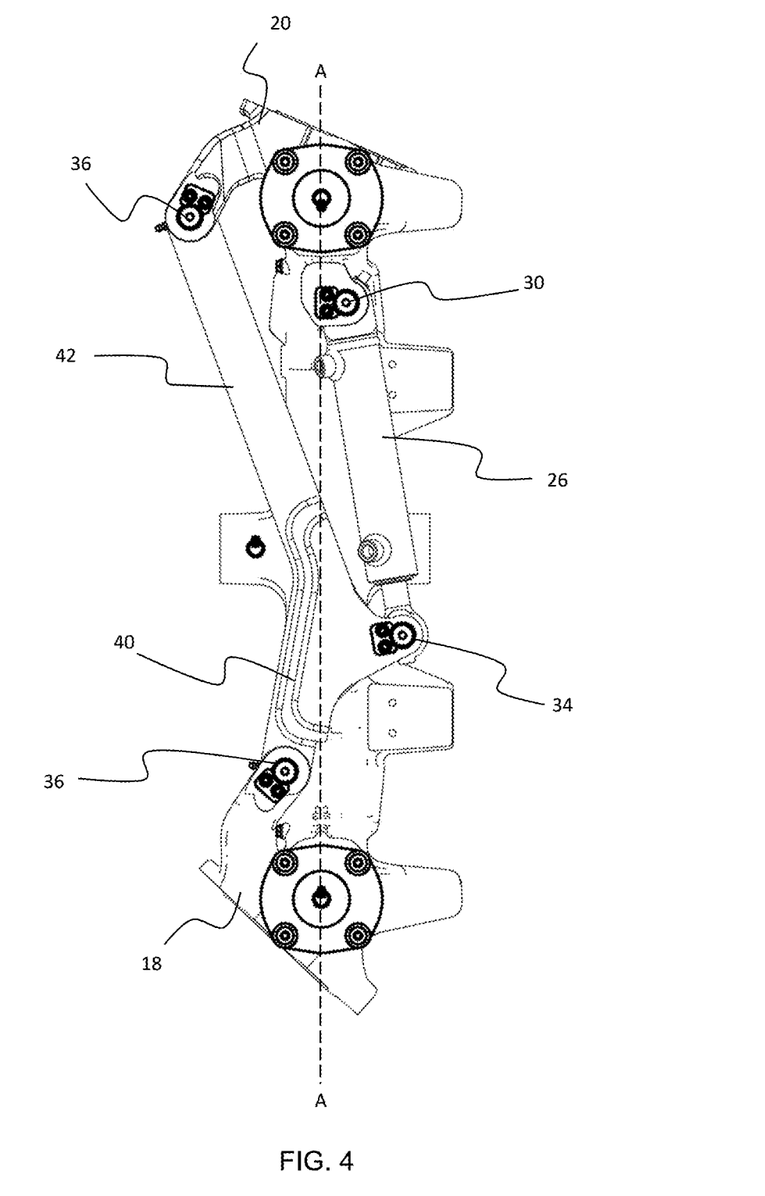
FIG. 4 is a plan view of the axle assembly of FIG. 1 in a third steering position.

Referring now to FIGS. 2 to 4, the steering arrangement 22 is illustrated in more detail. The actuator 26 is pivotally connected to the axle 12 and is connected to the steering linkage 26. Put another way, the actuator 26 is directly connected between the axle 12 and the linkage 24.

The steering linkage 24 connects to the first and second wheel mounts 18, 20 at first and second connection points 36, 38 (i.e. wheel mount connection points). A first end 28 of the actuator 26 is pivotally connected to the axle 12 at a third connection point 30 (i.e. at an axle-actuator connection point 30). A second end 32 of the actuator 26 is pivotally connected to the linkage 24 at a fourth connection point 34 (i.e. at an actuator-linkage connection point 34). This arrangement utilises two components, the actuator and the steering linkage, to provide a connection between the axle 12 and the wheel mounts 18, 20 in order to effect pivoting of the first and second wheel mounts 18, 20.

The axle 12 defines a central elongate axis indicated by the axis A-A. The steering linkage 24 connects to the first and second wheel mounts 18, 20 at first and second connection points 36, 38 that are spaced apart from said central elongate axis A-A of the axle 12. Put another way, the first and second connection points 36, 38 are positioned inboard of the axle 12. In the illustrated arrangement, a majority of the steering linkage 24 is positioned away from the central elongate axis A-A of the axle 12.

In the arrangement shown, the third connection point 30 is positioned to be spaced apart from said central elongate axis A-A of the axle 12 (i.e. in the illustrated arrangement the third connection point 30 is positioned to be outboard of said central axis A-A of the axle 12. The fourth connection point 34 is positioned to be spaced apart from said central elongate axis A-A of the axle 12 (i.e. in the illustrated arrangement the fourth connection point 34 is positioned to be outboard of said central axis A-A of the axle 12. Put another way, the actuator 26 is positioned to be spaced apart from said central elongate axis A-A of the axle 12 (i.e. the actuator 26 is positioned to be outboard of said central axis A-A of the axle 12). In alternative arrangements, the third connection point 30 and/or the fourth connection point 34 may be arranged so as to be substantially aligned with the central elongate axis A-A of the axle 12. That is, in alternative arrangements, the actuator 26 may be arranged so as to be substantially aligned with the central elongate axis A-A of the axle 12.

Positioning of the first and second connection points 36, 38 on a first side of the axle 12 and positioning the third and fourth connection points 30, 34 either in line with or on an opposing side of the central elongate axis A-A of the axle 12 has been found to enable the steering arrangement 22 to provide high steer angles.

In the illustrated arrangement, the steering linkage 24 is provided as a unitary body extending between the first and second wheel mounts 18, 20. This arrangement reduces the number of components required in the steering arrangement 22.

The steering linkage 24 is substantially non-linear in plan view. The steering linkage 24 includes first and second arms 40, 42 extending away from the actuator-linkage connection point 34. The first and second arms 40, 42 are arranged so as to be non-coplanar. Put another way, the first and second arms 40, 42 are angled relative to each other (e.g. are arranged at an obtuse angle relative to one another). This layout of the steering linkage 24 reduces the size of the footprint of the linkage 24, which facilitates assembly of the steering arrangement 22 onto the axle 12. This steering linkage layout further facilitates assembly of the axle assembly 10 on to an undercarriage of a working machine. Whilst the steering linkage 24 has been discussed as being a unitary component, it will be appreciated that in alternative arrangements the steering linkage 24 may be provided as an assembly of different linkages (e.g. the first and second linkage arms 40, 42 may be formed separately and assembled together to form the steering linkage 24).

In the steering position illustrated in FIG. 2, the first and second wheel mounts 18, 20 are substantially parallel. That is, in this steering arrangement, the wheels of a working machine would be arranged to drive said working machine in a straight (i.e. forwards-rearwards) direction. In this steering position, the actuator 26 is aligned substantially parallel to the central axis A-A of the axle 12. This arrangement has been found to improve the packaging of the steering arrangement 22 on the axle assembly 10.

In the steering positions illustrated in FIGS. 3 and 4, the steering arrangement 22 is configured to steer first and second wheels (via first and second wheel mounts 18, 20) at different steer angles, which enables the steering arrangement 22 to provide smoother travel of a working machine during a turning manoeuvre. This also provides a more energy efficient arrangement for turning a working machine In the arrangement shown, the steering arrangement 22 is configured to provide Ackermann steering to the first and second wheels (via the first and second wheel mounts 18, 20). Ackerman steering refers to turning the inside and outside wheels at different angles that follow different theoretical arcs having the same centre point. Such an arrangement provides the optimal angles for the first and second wheels during a steering operation so as to prevent tire scrubbing during turns. Put another way, the wheels of a working machine (via the first and second wheel mounts 18, 20) are steered with an Ackerman type steering arrangement 22. As the wheel mounts 18, 20 are steered the inside wheels travel along a tighter arc than the outside wheels.

Figure 5:
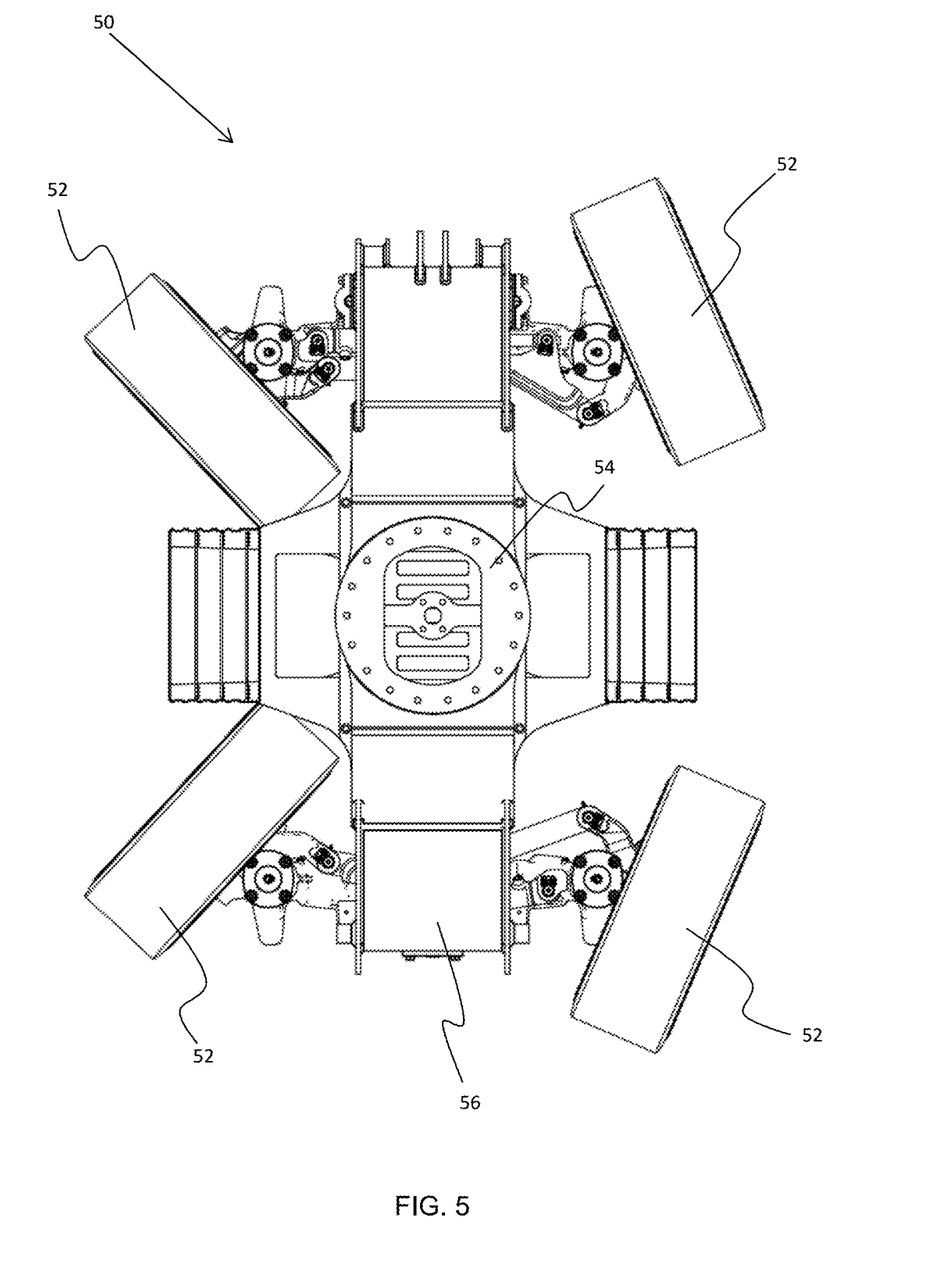
FIG. 5 is a plan view of an undercarriage according to an embodiment.

Referring to FIG. 5, an undercarriage is illustrated and is indicated generally at 50. The undercarriage 50 is formed from a chassis 56 extending fore-aft. The chassis 56 provides a majority of the strength of the undercarriage 50. The chassis includes a mounting arrangement 54 for mounting a superstructure and/or an operator seat thereon.

The undercarriage 50 is connected to a ground engaging structure, which in this embodiment includes first and second axle assemblies 10 mounted to the undercarriage 50. Each axle 10 includes wheels 52 rotatably attached at opposing ends of the respective axle 12. In this embodiment, both the front and rear axle assemblies 10 are provided as the axle assembly described above with reference to FIGS. 1 to 4. The wheels 52 connected to both axles 12 are steerable via the respective wheel mounts 18, 20.

In the illustrated arrangement, the undercarriage 50 includes Ackermann steered front and rear wheels 52. Put another way, the undercarriage 50 of this arrangement is configured to provide four wheel steer. Each wheel is intended to be driven by a respective hydraulic motor (not shown), which is in turn driven by a prime mover. Put another way, the undercarriage 50 is configured to provide four wheel drive. In alternative arrangements, it will be appreciated that the undercarriage 50 may only provide two wheel steer, and only the front wheels 52 or rear wheels 52 may be steerable by an Ackerman steering arrangement.

The undercarriage 50 defines a wheelbase extending between the front and rear axles. The undercarriage 50 further defines a track width extending between the centre points of the opposing wheels connected to each axle. In the illustrated arrangement, the ratio between the wheelbase and the track width is in the range of 0.8-1.2:1, e.g. approximately 1.1:1. In alternative arrangements, the ratio between the wheelbase and the track width is in the range may be in the range 0.85-1.15:1, for example the ratio between the wheelbase and the track width may be approximately 1:1.

Figure 6:
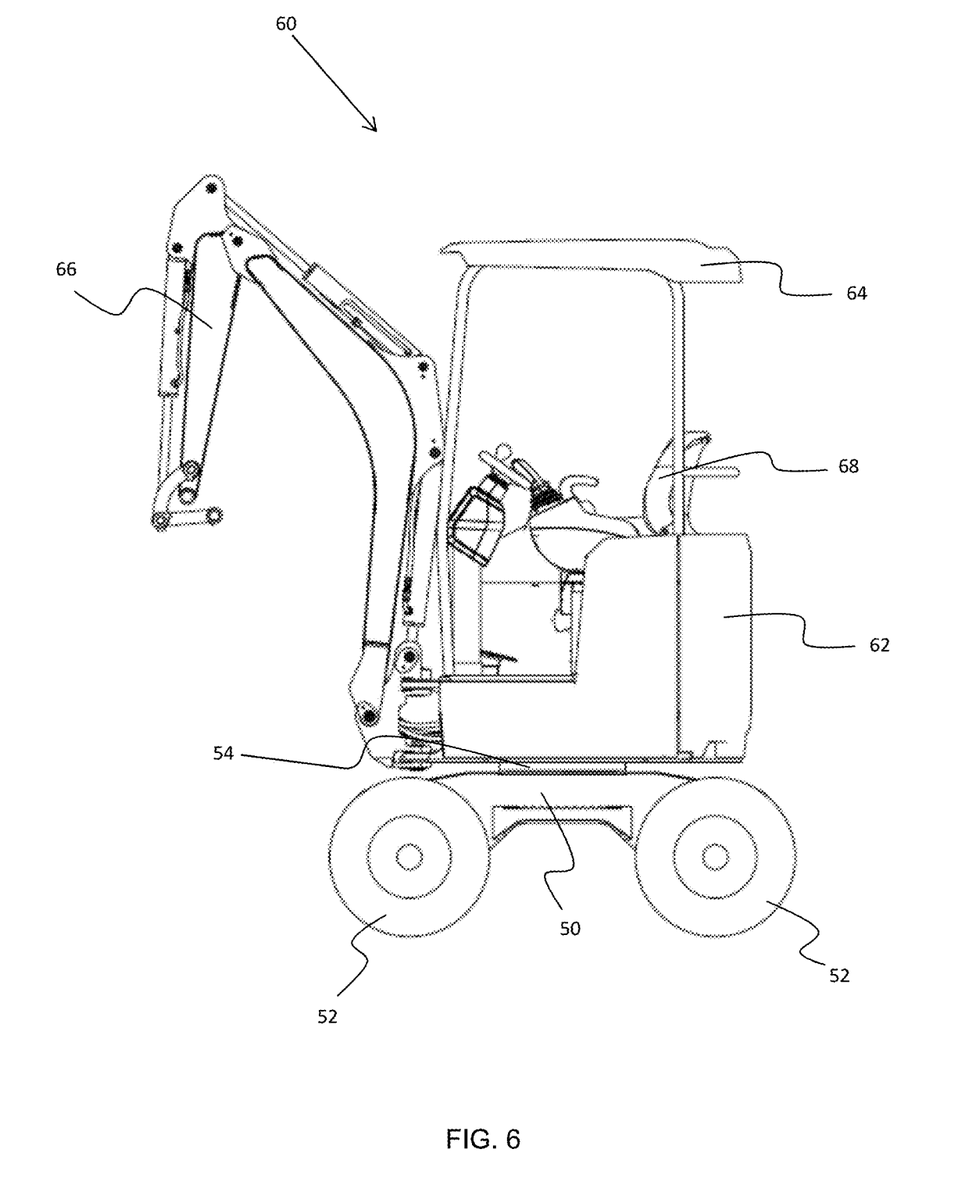
FIG. 6 is a side view of a working machine according to an embodiment.

With reference to FIG. 6, there is illustrated in somewhat simplified form a working machine 60. In the present embodiment, the working machine 60 may be considered to be a machine is a mini excavator (operating weight between 1.2 and 6 metric tonnes) but could be any type of wheeled working machine such as a midi excavator (operating weight between approx. 6 and 12 metric tonnes), a wheeled excavator, a loader, a dumper, a forklift, a telehandler etc.

The working machine 60 includes an undercarriage 50 as described with reference to FIG. 5. A superstructure 62 is connected to the undercarriage 50 by a mounting arrangement 54. In the arrangement shown, the mounting arrangement 54 is slewing mechanism in the form of a slewing ring. The mounting arrangement 54 permits unrestricted rotation of the superstructure 62 relative to the undercarriage 50 in this embodiment. A cab 64 from which an operator can operate the working machine 60 is mounted to the superstructure. The cab 64 includes an operator seat 68. It will be appreciated that in some arrangements, the working machine 60 may not include a cab 64 and the operator seat 68 may be directly connected on the undercarriage 50. A working arm arrangement 66 is rotatably mounted to the superstructure 62 and is provided for performing excavating operations.

Although the teachings have been described above with reference to one or more preferred embodiments, it will be appreciated that various changes or modifications may be made without departing from the scope as defined in the appended claims.

The invention claimed is:

1. An axle assembly for a working machine, the axle assembly comprising:
   an axle having first and second ends, the first end having a first wheel mount for pivotably mounting a first wheel to the axle and the second end having a second wheel mount for pivotably mounting a second wheel to the axle; and
   a steering arrangement for pivoting the first and second wheel mounts relative to the axle, the steering arrangement comprising a steering linkage member connected between the first and second wheel mounts and configured to pivot the first and second wheel mounts relative to the axle,
   wherein the steering arrangement comprises an actuator configured to actuate the steering linkage in order to effect pivoting of the first and second wheel mounts,
   wherein the actuator is directly connected to the steering linkage member, and
   wherein the steering linkage member is substantially non-linear.

2. The axle assembly according to claim 1, wherein the steering arrangement is configured to pivot the first and second wheel mounts at different angles relative to the axle, optionally wherein the steering arrangement is configured to provide Ackermann steering to the first and second wheel mounts.

3. The axle assembly according to claim 1, wherein the actuator is a linear actuator.

4. The axle assembly according to claim 3, wherein a first end of the actuator is pivotally connected to the axle and a second end of the actuator is connected to the steering linkage.

5. The axle assembly according to claim 1, wherein the axle defines a central elongate axis, and wherein the steering linkage is connected to the first and second wheel mounts at first and second connection points, said first and second connection points arranged to be spaced apart from said central elongate axis of the axle.

6. The axle assembly according to claim 5, wherein a first end of the actuator is pivotally connected to the axle at a third connection point, and wherein the third connection point is arranged to be substantially co-planar with the central elongate axis of the axle or is arranged to be on an opposing side of the central elongate axis of the axle to the first and second connection points.

7. The axle assembly according to claim 6, wherein the position of the third connection point is fixed relative to the axle.

8. The axle assembly according to claim 5, wherein a second end of the actuator is connected to the steering linkage at a fourth connection point, and wherein the fourth connection point is arranged to be co-planar with the central elongate axis of the axle or is arranged to be on an opposing side of the central elongate axis of the axle to the first and second connection points.

9. The axle assembly according to claim 1, wherein, when the first and second wheel mounts are arranged to be substantially parallel, the actuator is aligned substantially parallel to a central elongate axis of the axle.

10. The axle assembly according to claim 1, wherein the axle defines a central elongate axis, and wherein the actuator is spaced apart from said central elongate axis on a first side of the axle.

11. The axle assembly according to claim 10, wherein a majority of the steering linkage is spaced apart from said central elongate axis on a second side of the axle opposing said first side of the axle.

12. The axle assembly according to claim 1, wherein the steering linkage and the actuator are positioned above the axle, in use.

13. The axle assembly according to claim 1, wherein the steering linkage is formed as a unitary body.

14. The axle assembly according to claim 1, wherein the steering linkage is directly connected to the first and second wheel mounts.

15. An undercarriage for a working machine, the undercarriage comprising:
   a chassis;
   a front axle assembly mounted to the chassis; and a rear axle assembly mounted to the chassis, wherein the front axle assembly and/or the rear axle assembly is an axle assembly according to claim 1.

16. The undercarriage according to claim 15, wherein the front axle assembly and rear axle assembly each comprise a pair of wheels mounted thereto.

17. The undercarriage according to claim 16, wherein the undercarriage defines a wheelbase and a track width, and wherein the ratio between the wheelbase and the track width is in the range of 0.8-1.2:1, e.g. approximately 1:1.

18. A working machine comprising:
   an undercarriage according to claim 15, the undercarriage connected to a ground engaging structure; and
   an operator seat.

19. The working machine according to claim 18, wherein the working machine is an excavator, a loader, a dumper, a forklift or a telehandler.

20. An axle assembly for a working machine, the axle assembly comprising:

an axle having first and second ends, the first end of the axle having a first wheel mount for pivotably mounting a first wheel to the first end of the axle, the second end of the axle having a second wheel mount for pivotably mounting a second wheel to the second end of the axle;

a steering arrangement for pivoting the first and second wheel mounts relative to the axle, the steering arrangement including an actuator directly connected via an actuator connection point to only a single steering linkage member, the actuator configured to shift the steering linkage member in order to pivot each of the first and second wheel mounts relative to the axle;

the steering linkage member being directly connected to the first wheel mount at a first connection point and being directly connected to the second wheel mount at a second connection point; and wherein the steering linkage member is a non-linear body.

21. The axle assembly of claim 20, the axle assembly having a central axis, wherein the first and second connection points are disposed on one side of the central axis and the actuator connection is disposed on a second and opposite side of the central axis, and wherein the actuator connection point is located between the first connection point and the second connection point.

\* \* \* \* \*